United States Patent
Popescu et al.

(10) Patent No.: US 12,518,090 B2
(45) Date of Patent: Jan. 6, 2026

(54) LOGICAL ROLE DETERMINATION OF CLAUSES IN CONDITIONAL CONSTRUCTIONS OF NATURAL LANGUAGE

(71) Applicant: INTERNATIONAL BUSINESS MACHINES CORPORATION, Armonk, NY (US)

(72) Inventors: Octavian Popescu, Katonah, NY (US); Irene Lizeth Manotas Gutiérrez, White Plains, NY (US); Vadim Sheinin, Yorktown Heights, NY (US); Ngoc Phuoc An Vo, Bronx, NY (US); Algimantas Černiauskas, Vilnius (LT)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 17/682,177

(22) Filed: Feb. 28, 2022

(65) Prior Publication Data
US 2023/0274087 A1 Aug. 31, 2023

(51) Int. Cl.
*G06F 40/211* (2020.01)
*G06F 40/279* (2020.01)
*G06F 40/30* (2020.01)

(52) U.S. Cl.
CPC .......... *G06F 40/211* (2020.01); *G06F 40/279* (2020.01); *G06F 40/30* (2020.01)

(58) Field of Classification Search
CPC ...... G06F 40/30; G06F 40/289; G06F 40/279; G06F 40/284; G06F 40/211;
(Continued)

(56) References Cited

U.S. PATENT DOCUMENTS 6,295,529 B1 * 9/2001 Corston-Oliver ..... G06F 40/194
  707/738
8,781,815 B1 * 7/2014 Gidney ................... G06F 40/30
  704/4
(Continued)

OTHER PUBLICATIONS

Affolter et al., "A Comparative Survey of Recent Natural Language Interfaces for Databases", arXiv:1906.08990v1 [cs.DB] Jun. 21, 2019, 29 pages.
"Automatic Transformation of Unstructured and Semi-Structured Document Tables to Structured Relational Database Format", ip.com, Published Mar. 11, 2016, IPCOM000245463D, 8 pps.
(Continued)

*Primary Examiner* — Richemond Dorvil
*Assistant Examiner* — Zeeshan Mahmood Shaikh
(74) *Attorney, Agent, or Firm* — Shackelford, McKinley & Norton, LLP

(57) ABSTRACT

A natural language processor and applicable method receives an input sentence of natural language from a natural language corpus. The input sentence comprises sentence clauses that include a conditional clause. The processor performs natural language processing (NLP), using an NLP model, on the input sentence. The processing comprises using a set of rules determining the sentence clauses and which of the sentence clause is the conditional clause, determining one or more logical connections between the sentence clauses, and determining a role of the sentence clauses based upon the one or more identified logical connections. The sentence clauses are tagged to produce a labeled sentence that is output to an entity that is one or more of a storage device, a network interface, a storage device, and an input of a further language processor or application.

20 Claims, 5 Drawing Sheets

(58) Field of Classification Search
CPC ............... G06F 16/3344; G06F 40/205; G06F 16/3329; G06F 40/253; G06F 40/40; G06F 40/268; G06F 40/56; G06F 40/20; G06F 40/237; G06F 16/243
See application file for complete search history.

(56) References Cited

U.S. PATENT DOCUMENTS

| | | | |
|---|---|---|---|
| 9,779,083 B2* | 10/2017 | Daraselia | G06F 16/313 |
| 10,467,344 B1* | 11/2019 | Jade | G06F 40/205 |
| 11,036,867 B2 | 6/2021 | Bhatia | |
| 11,100,144 B2 | 8/2021 | Galitsky | |
| 2006/0224959 A1 | 10/2006 | Mcguire | |
| 2012/0253793 A1* | 10/2012 | Ghannam | G06F 40/169 704/9 |
| 2014/0250047 A1 | 9/2014 | Bounouane | |
| 2016/0042058 A1* | 2/2016 | Nguyen | G06F 40/30 707/771 |
| 2018/0137110 A1* | 5/2018 | Burchard | G06F 40/56 |
| 2018/0365593 A1 | 12/2018 | Galitsky | |
| 2020/0272741 A1 | 8/2020 | Bhatia | |
| 2020/0327151 A1* | 10/2020 | Coquard | G06F 16/3347 |
| 2020/0342052 A1* | 10/2020 | Flann | G06F 40/253 |
| 2020/0349183 A1* | 11/2020 | Jayaraman | G06N 3/0499 |
| 2023/0135318 A1* | 5/2023 | Hamlin | G06F 16/93 707/694 |

OTHER PUBLICATIONS

"Default Finally Clause for Loop Constructs in Programming Languages", Jan. 25, 2005, ip.com, IPCOM000035580D, 3 pps.

"Involuntary Revolution of Formless/Semi-Structured Document and Applying Different Analytics", ip.com, Published Nov. 2, 2018, IPCOM000256074D, 6 pps.

Arora et al., "Tree Conditional Random Fields for Japanese Semantic Role Labeling", Language Technologies Institute, 7 pps., <http://www.cs.cmu.edu/~wcohen/10-707/sample-projects/11-748_project_shilpa_frank_hideki_mengqiu-1.pdf>.

Breja et al., "Causality for Question Answering", COLINS-v2604, pp. 884-893, CEUR-WS.org, 2020.

Danlos, "Sentences with Two Subordinate Clauses: Syntactic and Semantic Analyses, Underspecified Semantic Representation," Proceedings of the 7th International Workshop on Tree Adjoining Grammar and Related Formalisms, May 8, 2004, p. 140-147, Simon Fraser University, Vancouver, Canada, <https://aclanthology.org/W04-3319>.

Mell et al., "The NIST Definition of Cloud Computing", National Institute of Standards and Technology, U.S. Department of Commerce, NIST Special Publication 800-145, Sep. 2011, 7 pages.

Nikitina et al., "A corpus study of clause combination," Proceedings of the 10th International Conference on Computational Semantics (IWCS 2013)—Long Papers, Mar. 8, 2013, Association for Computational Linguistics,. Potsdam, Germany, 11 pps., <https://aclanthology.org/W13-0116>.

* cited by examiner

LOGICAL ROLE DETERMINATION OF CLAUSES IN CONDITIONAL CONSTRUCTIONS OF NATURAL LANGUAGE

BACKGROUND

Disclosed herein is a system and related method for processing natural language. In particular, various embodiments are provided for a logical role determination of clauses in conditional constructions of natural language.

In natural language processing, text sentences are processed so that their proper meaning may be detected and acted upon by applications and other entities. Traditionally, the processing would involve a parser that attempts to break down the sentence and determine parts of speech and meaning of the various clauses that make up the sentence. However, some parts of a sentence provide greater challenges than others in order to correctly interpret their intended meaning. In particular, conditional clauses in sentences may be difficult to parse since conditional clauses may take on so many different forms and have relationships with other parts of the sentence that are not always formulaic in nature. Thus, when using traditional parsers, conditional clauses using relatively simplistic analysis may fail to properly identify conditional clauses within sentences and/or fail to properly identify their relationships with other clauses or parts of the sentence.

SUMMARY

A computer implemented method is provided using a natural language processor. The Natural language processor receives an input sentence of natural language from a natural language corpus. The input sentence comprises sentence clauses that include a conditional clause. The processor performs natural language processing (NLP), using an NLP model, on the input sentence. The processing comprises using a set of rules determining the sentence clauses and which of the sentence clause is the conditional clause, determining one or more logical connections between the sentence clauses, and determining a role of the sentence clauses based upon the one or more identified logical connections. The sentence clauses are tagged to produce a labeled sentence that is output to an entity that is one or more of a storage device, a network interface, a storage device, and an input of a further language processor or application. Advantageously, use of the set of rules to determine the conditional clauses provides more flexibility and accuracy in identifying the conditional clauses in the sentence and the relationship of the conditional clauses with other sentence parts.

A natural language processing apparatus is provided comprising a memory and a natural language processor. The Natural language processor receives an input sentence of natural language from a natural language corpus. The input sentence comprises sentence clauses that include a conditional clause. The processor performs natural language processing (NLP), using an NLP model, on the input sentence. The processor uses a set of rules determining the sentence clauses and which of the sentence clause is the conditional clause, determines one or more logical connections between the sentence clauses, and determines a role of the sentence clauses based upon the one or more identified logical connections. The sentence clauses are tagged to produce a labeled sentence that is output to an entity that is one or more of a storage device, a network interface, a storage device, and an input of a further language processor or application. Advantageously, use of the set of rules to determine the conditional clauses provides more flexibility and accuracy in identifying the conditional clauses in the sentence and the relationship of the conditional clauses with other sentence parts.

The system and related method may use an aligner for receiving the sentence and the sentence metadata comprising syntactic and semantic information, and producing sentence information attached to at least one of words or phrases of the sentence by applying usable alignment aspects to the sentence. Advantageously, by using the aligner to process both syntactic and sematic information of the sentence allows a rule executor to apply both syntactic and semantic rules to further refine and improve the identification of the conditional clauses and their relationships to other sentence parts.

The system and related method may use a rule executor for receiving the ordered information, determining a set of triggers within the ordered information, and, for all triggers, performing all-trigger activities that may include one or more of: determining a beginning of a conditional clause, determining an end of the conditional clause, checking to determine whether the trigger really starts a conditional rule, checking a compatibility of previously extracted triggers, extracting the conditional clause, extracting phrases related to the conditional, choosing an action or consequence, and choosing an unconditional action when one exists. Advantageously, application of the trigger activities and relevant rules helps to improve the accuracy of the determination of a conditional clause in the sentence and its relationship to other sentence clauses.

The system and related method may determine an action versus entailment, determine a continuation of the conditional clause, and resolve a conflict associated with the conditional clause. Advantageously, this allows for a more accurate interpretation of the conditional clause.

The system and related method may identify logically linked conditional clauses that are logically linked to a logical test clause (LTC). This may be done by determining whether an argument from a particular clause is linked syntactically or semantically to the conditional clause, extracting all such conditional clauses as candidates, identifying an imperative versus an entailment character of the clause, determining for each candidate whether it is a context clause or a consequent clause. Advantageously, this may further improve a correct identification of the conditional clause and the related clauses in the sentence that apply.

Furthermore, embodiments may take the form of a related computer program product, accessible from a computer-usable or computer-readable medium providing program code for use, by, or in connection, with a computer or any instruction execution system that perform the above-described operations. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:
API application program interface
ARM advanced RISC machine
CD-compact disc ROM
ROM
CMS content management system
COD capacity on demand
CPU central processing unit
CUOD capacity upgrade on demand
DPS data processing system
DVD digital versatile disk
EVC expiring virtual currency (a virtual currency having an expiration date, or subject to other virtual currency usage rules; local virtual currencies with expiration dates)
EVCU expiring virtual currency (units)
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
VCUR virtual currency usage rules
WAN wide-area network Table 1

General Acronyms

Data Processing System in General

Figure 1A:
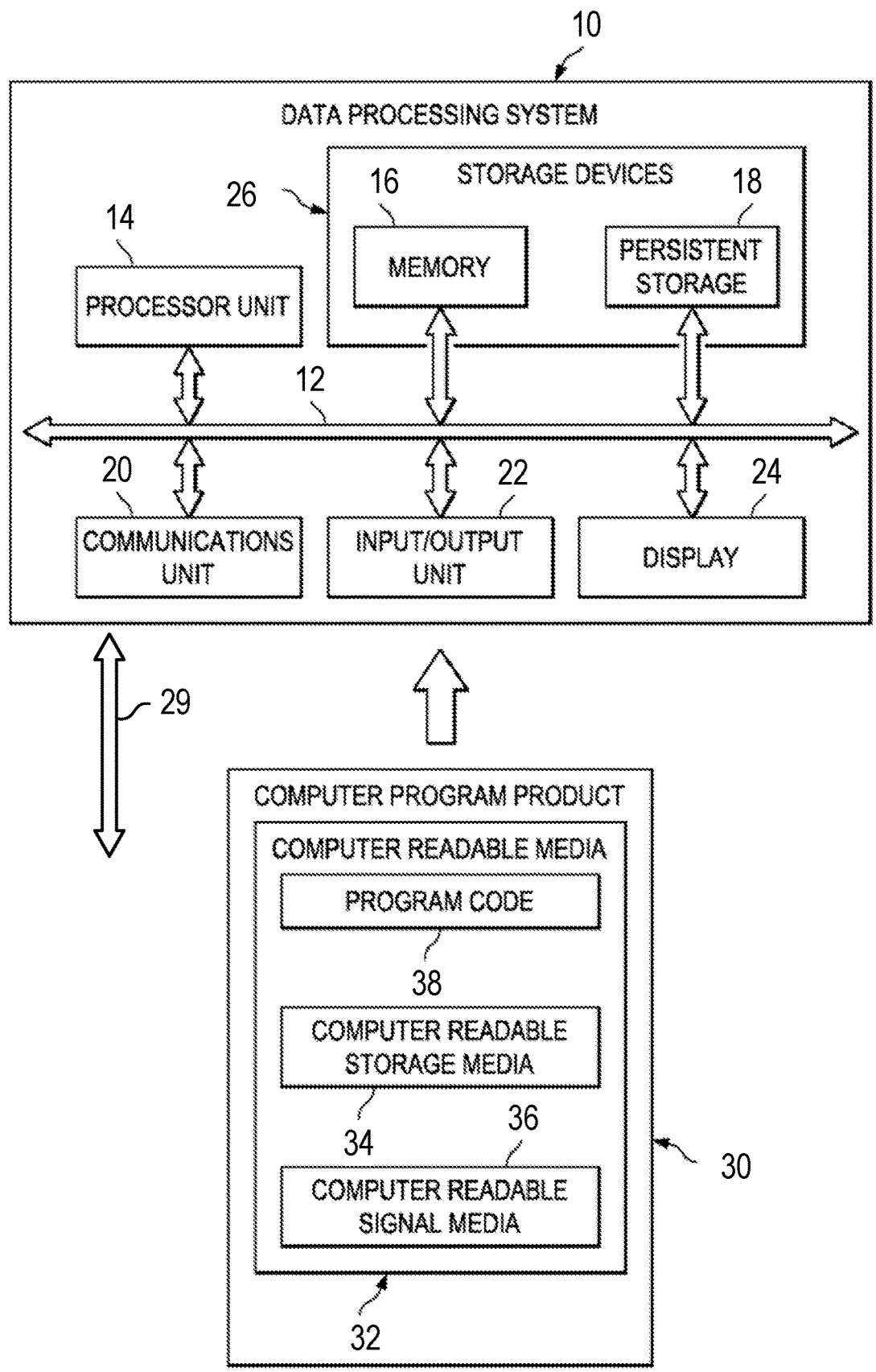
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
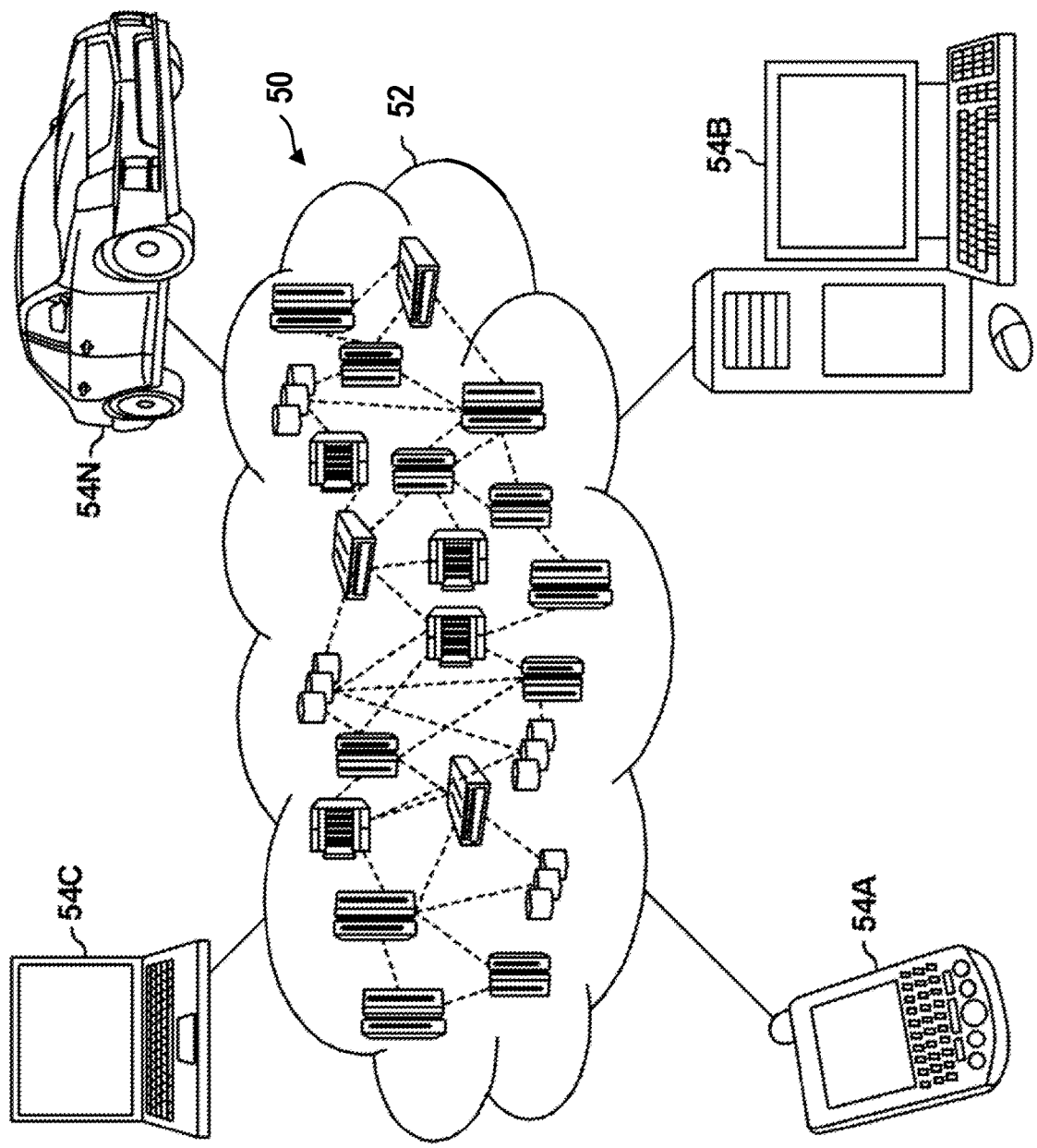
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
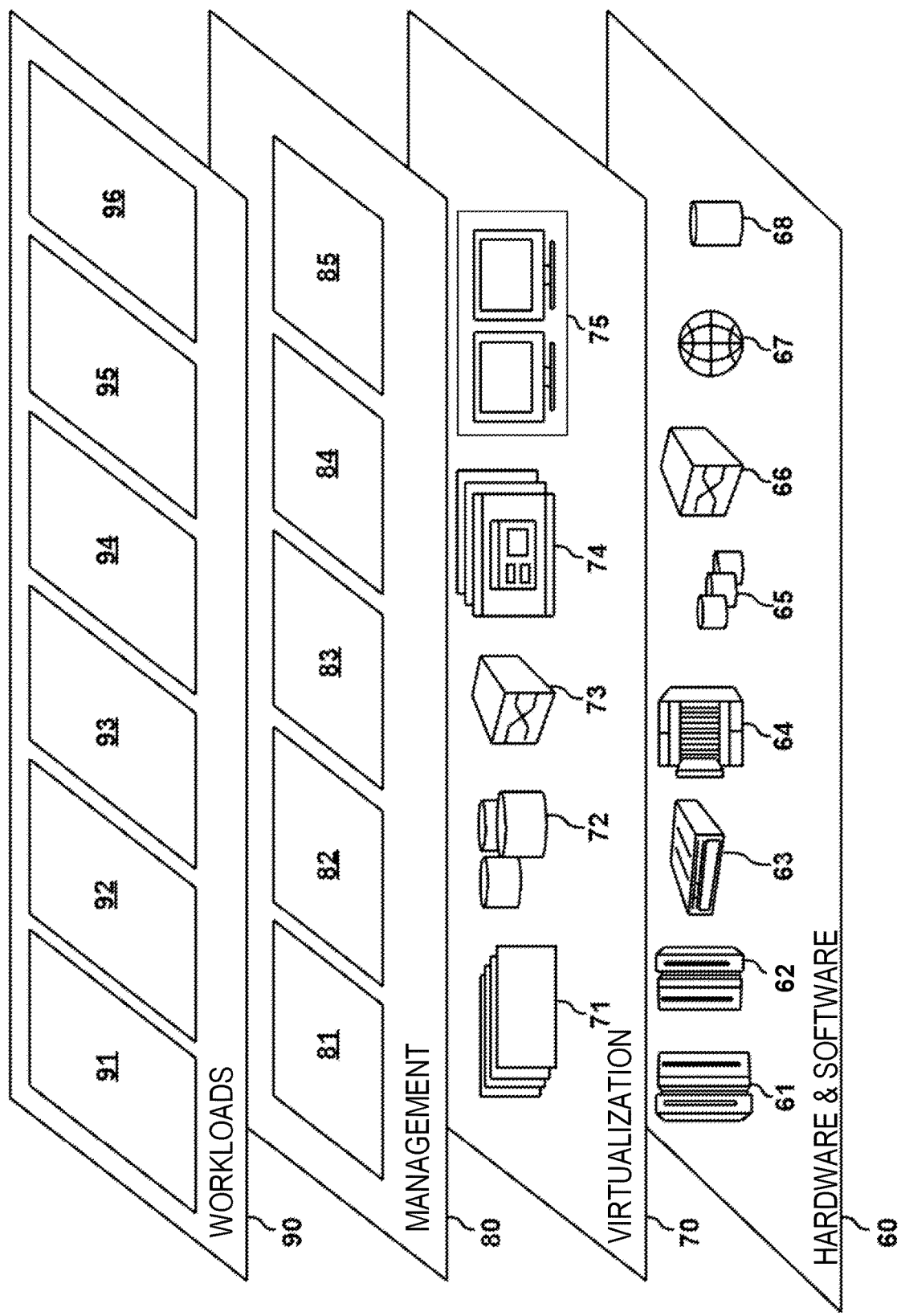
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52 as well as the computing devices 54A-N may be a DPS 10.
Computer Readable Media The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Language Processing

The following application-specific acronyms may be used below:
   JSON JavaScript Object Notation
   LTC logical test clause
   ML machine learning
   NLP natural language processor (processing)
   POS part(s)-of-speech
   SVM support vector machine Table 2

Application-Specific Acronyms

Language is comprised of many elements, features, and structures (and relationships between them) that give language its vast power. Computer-based analytics of language may pose many challenges, since the parts of language are not always apparent and ambiguities may be present. In linguistics, a (text) corpus is a language resource consisting of a large and structured set of texts. In corpus linguistics, they are used to do statistical analysis and hypothesis testing, checking occurrences, or validating linguistic rules within a specific language territory.

The computer-based analytics may comprise a natural language processor (NLP) for doing natural language processing, and this NLP may be a computer module (generally a combination of hardware and software) that analyses received content and other information. The NLP may utilize a DSP 10, as described above. The NLP may perform various methods and techniques for analyzing textual information (e.g., syntactic analysis, semantic analysis, etc.). The NLP may be configured to recognize and analyze any number of natural languages. In some embodiments, the NLP may parse passages of documents or content from stored information. Various components (not depicted) of the NLP may include, but are not limited to, a tokenizer, a part-of-speech (POS) tagger, a semantic relationship identifier, and a syntactic relationship identifier. The NLP may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the PoS tagger may be a computer module that marks up a word in passages to correspond to a particular part of speech. The PoS tagger may read a passage or other text in natural language and assign a part of speech to each word or other token. The PoS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., property records of a user, transaction records from previous transactions). Examples of parts of speech that may be assigned to words include, but are not limited to, nouns, verbs, adjectives, adverbs, and the like. Examples of other part of speech categories that PoS tagger may assign include, but are not limited to, comparative or superlative adverbs, wh-adverbs, conjunctions, determiners, negative particles, possessive markers, prepositions, wh-pronouns, and the like. In some embodiments, the PoS tagger may tag or otherwise annotate tokens of a passage with part of speech categories. In some embodiments, the POS tagger may tag tokens or words of a passage to be parsed by the NLP.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the NLP may be a computer module that may parse a document and generate corresponding data structures for one or more portions of the document. For example, in response to receiving an instruction to parse a portion of text, the NLP may output parsed text elements from the data. In some embodiments, a parsed text element may be represented in the form of a parse tree or other graph structure. To generate the parsed text element, the NLP may trigger computer modules including the tokenizer, the POS tagger, the SVM generator, the semantic relationship identifier, and the syntactic relationship identifier.

In some embodiments, the NLP may leverage one or more of the example machine learning techniques to perform machine-learning (ML) text operations. Specifically, the NLP may operate to perform machine-learning text classification and/or a machine-learning text comparison. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, PoS tagger, semantic relationship identifier, syntactic relationship identifier, and the like. The ML text operations may include the use of vectorization of text, such as the vectorization of words from a tokenizer, PoS tagger, semantic relationship identifier, syntactic relationship identifier, and the like. For example, a paragraph of text may include the phrase "automobile is registered as an orange sedan." Vectorization of the word "orange" may include setting input neurons of a neural network to the various words of the phrase including the word "orange." The output value may be an array of values (e.g., forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a color of paint for automobiles", other parts of a paragraph that contains the phrase, other parts of language).

In order to make a text corpus more useful for doing linguistic research and performing NLP, it may be subjected to a process known as annotation. An example of annotating a corpus is the POS-tagging discussed above, in which information about each word's or phrase's part of speech (verb, noun, adjective, etc.) is added to the corpus in the form of tags. Another example is indicating the lemma (base) form of each word. The text corpus may have further structured levels of analysis applied. In particular, the corpora may be fully parsed to produce "treebanks" or "parsed corpora". Other levels of linguistic structured analysis are possible, including annotations for morphology, semantics, and pragmatics.

Logical Role Determination of Clauses in Conditional Constructions of Natural Language Producing a parsed corpus may pose certain challenges when conditional language is present, given that there are many variations as to how such conditional language may be structured. In the English language, the word "if" is often (but not always) incorporated into a phrase or clause to denote conditional language, and such language is quite common. Some examples of phrases using conditional language (most, but not all, of which contain the word "if") are provided in Phrase Listing 1 below.

Don't bother to call him if he forgot his hat, he passes by every Thursday.
After he leaves, if the hat is still here, call him back.
Put your jacket on, and, if it rains, take the umbrella and go to the school bus.
Measure the pressure in the boiler and, if it higher than 80 pounds per square inch, reduce it to normal.
The receipts which are older than two weeks ago must be processed first.
There is a difference, if you look closely.

Phrase Listing 1

Example Sentences with Conditional Language

Some systems consider the word order and lexical features (e.g., punctuation) as building blocks for rules. Examples of such rules are: 1) a conditional is introduced by a conditional adverb; 2) a conditional is followed by a comma; and 3) the consequent follows in order to the conditional clause. However, in practice, most texts from technical documents (e.g., regulations, contracts, technical documents, troubleshooting manuals) are not written consistently in an easy manner, so the accuracy of current systems is low and limited.

As used herein, the word "sentence" is defined as a full grammatical sentence, but also as a proxy for a partial sentence, clause, group of sentences, text section, paragraph, and any bounded or structured collection of words or text. Conditionals may have a relationship to context and context. Often, the context clause of a conditional is left out, but it can be inferred from the information already given, or, alternately, it may be assumed that the condition is universal.

In a conditional sentence, there are different types of logical clauses (sentence clauses): 1) the "context", which is a clause that specifies one or more conditions in which the test is carried out (logically independent of the conditional); 2) the "logical test clause" (LTC), which is a clause that contains a test/condition; 3) the "consequent", which is an action/consequence that should follow the test; and 4) the "independent", which is text or a clause that is independent of the logical test.

The following example in Phrase Listing 2 illustrates an identification and tagging of the logical clauses for the sentences in Phrase Listing 1.

Consequent {Don't bother to call him} LTC {if he forgot his hat,} Independent {he passes by every Thursday.}
Context {After he leaves,} LTC {if the hat is still here,} Consequent {call him back.}
Context {Put your jacket on, and,} LTC {if it is raining,} Consequent {take the umbrella and go to the school bus.}
Context {Measure the pressure in the boiler and,} LTC {if it higher than 80 pounds per square inch,} Consequent {reduce it to normal.}
LTC {The receipts which are older than two weeks ago} Consequent {must be processed first.}
Independent {There is a difference,} LTC {if you look closely.}

Phrase Listing 2

Example Sentences with Clause Types Broken Down

From a natural language processing (NLP) perspective, determining the logical elements of a conditional sentence context, conditional, and consequent may be challenging. The conditional can be introduced via a multitude of forms (e.g., adverbs, prepositions, relative clauses). The constituent boundaries may be problematic for an automatic detection system. Furthermore, multiple conditionals logically connected may be present, each one having its own consequent. Finally, the relationship between clauses (independent/context/consequent) and their logical connections, may require semantic analysis.

LTC {If it rains} Consequent {do not go outside}
Rarely, the consequent is not specified:
LTC {If you look closely} Consequent {[you will see that]} Independent {there are differences}

The consequent may imply (or not) that a further action/event will take place:
LTC {If you see something}, Consequent {say something} [action (imperative)]
Consequent {You know that you slept too much} LTC {if there is light outside} [entailment (consequence)]

Some embodiments of the disclosure herein address previous shortcomings in dealing with sentence constituency based on clues of all types—lexical, syntactic, and semantic—that improve accuracy. Some embodiments incorporate subordination as a condition or the consequent, and classify the consequent, and a model to identify action or consequence from a consequent, particularly from the provided sentence with conditionals. Some embodiments classify a consequent into an action or a consequence.

Figure 2:
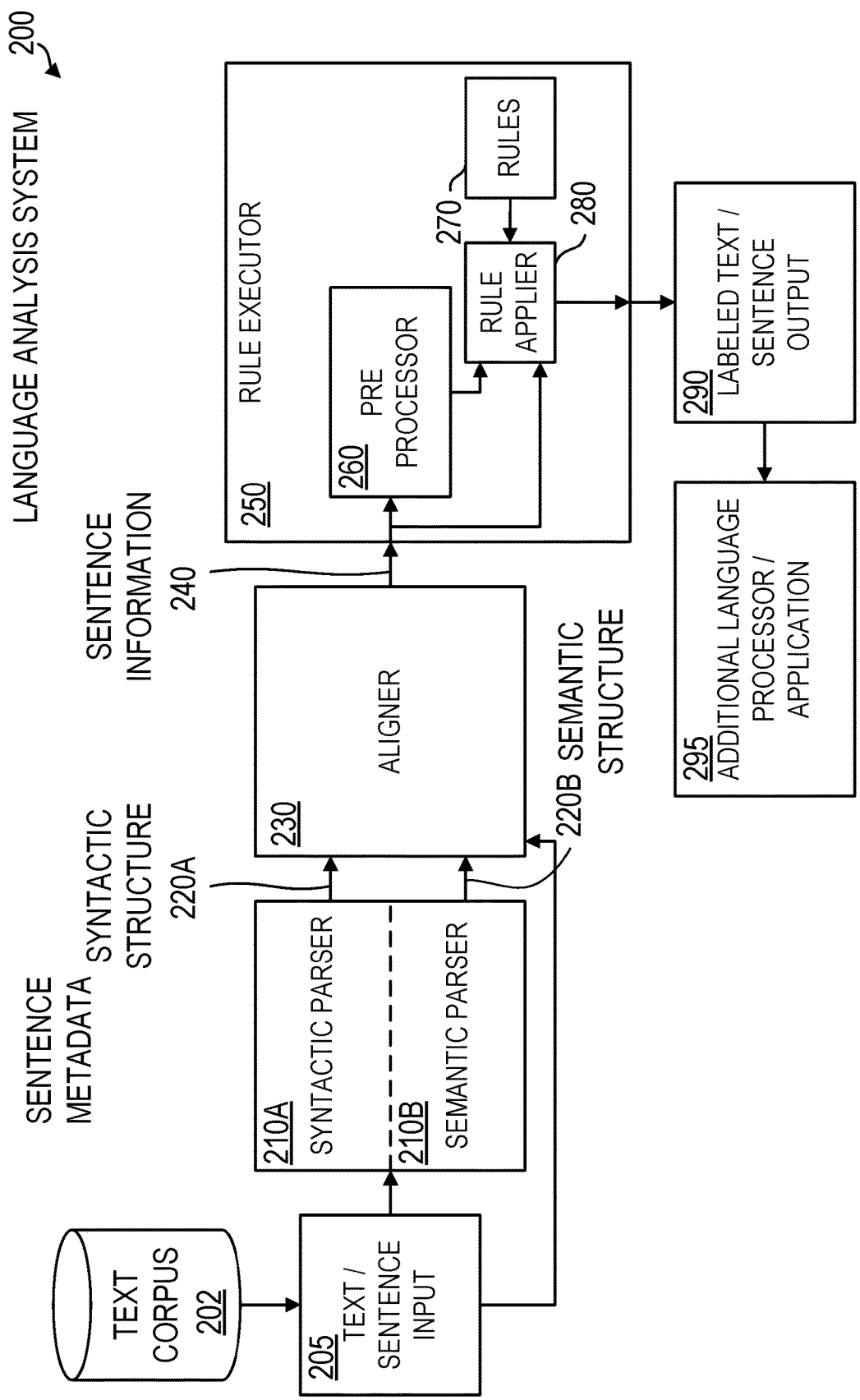
FIG. 2 is a block diagram that illustrates a language analysis system, according to some implementations.
Figure 3:
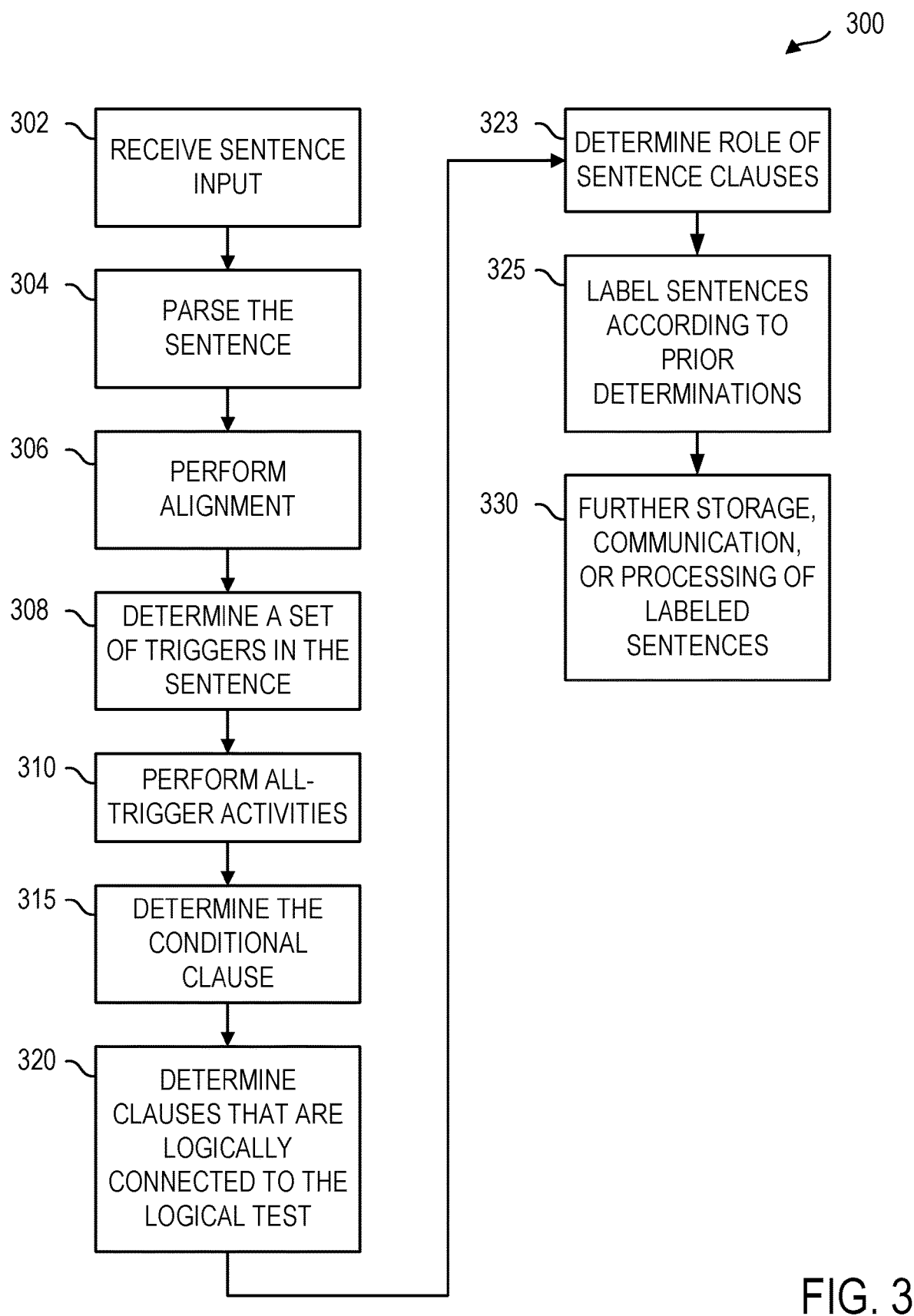
FIG. 3 is a flowchart that illustrates a process for analyzing language.

Various aspects of a system (FIG. 2) and method (FIG. 3) for a logical role determination of sentence clauses that include conditional clauses in conditional constructions of natural language are shown. FIG. 2 is a block diagram that illustrates an example language analysis system 200, according to some embodiments. FIG. 3 is a flowchart that illustrates an example language analysis process 300 according to some embodiments. The various operations that may be involved in the process 300 are discussed below in conjunction with the elements of the system 200. The system 200 may be a DPS 10, for example, or it may operate within a cloud computing environment 52. The process 300 may operate as application processing elements 96.

At a high level, the system 200 comprises a syntactic parser 210A, a semantic parser 210B (which may collectively be referred to herein as parser 210), an aligner 230, and a rules executor 250. The syntactic parser 210A takes the input data (here a sentence), and builds a data structure, which may be, e.g., a parse tree, abstract syntax tree or other hierarchical structure, giving a structural representation of the input while checking for correct language syntax. The parsing may be preceded or followed by other steps, or these may be combined into a single step. The syntactic parser 210A may be preceded by a separate lexical analyzer, which creates tokens from the sequence of input characters. The tokens may represent a word or multi-word concept. The semantic parser 210B may perform the task of converting a natural language utterance to a logical form: a machine-understandable representation of its meaning. The semantic parser 210B extracts the meaning of an utterance. However, the output of the syntactic parser 210A, the syntactic structure 220A, and the output of the semantic parser 210B, the semantic structure 220B (collectively referred to as sentence metadata 220) may differ from one another. Thus, the aligner 230 may be used to align these differing outputs into a cohesive whole, the sentence information 240, which is then provided to the rule executor 250 for further processing.

The process 300 begins with operation 302, in which the parser 210 may receive a sentence in the form of, e.g., text, at a text/sentence input 205 that is a part of a text corpus 202. In operation 304, the input sentence may be parsed using the parser 210. The parser 210 may be any known sentence parser and may include a lexical parser (not shown), the syntactic parser 210A, and the semantic parser 210B that respectively provide three types of information about the sentence: lexical, syntactic, and semantic. The parser 210 may also further identify lemmas, dependencies, constituents, and features (e.g., symbols, such as "$" for "dollars" or generic typing, e.g., "watermelon" for a "type of food") in the sentence, which may be, e.g., represented as sentence metadata 220.

However, the parser 210, while attempting to discern the beginnings and ends of the various sentence clauses while segregating them, may not correctly do so, and it may be wrong about its determination of the parts of speech, given the inherent difficulty of language and the various forms it may take. The aligner 230 receives its first input (syntactic structure 220A) from the syntactic parser 210A and its second input (semantic structure 220B) from the semantic parser 210B, and then performs an alignment that aligns the differing inputs into a cohesive whole, the sentence information 240, that may be used by the rule executor 250. In this way, the system 200 is better able to properly identify the beginning and ending of the sentence clauses, particularly the conditional clause.

Right Border Rules for Conditionals

Right border rules are those that may be used to determine where a sentence clause, and particularly the conditional clause, ends in a sentence. In operation 306, an alignment is performed by the aligner 230 that takes as its input the sentence metadata 220 (the syntactic structure 220A and the semantic structure 220B) of the sentence provided by the parser 210 as well as the sentence itself. The aligner 230 may produce sentence information 240 that may be attached to the words in the sentence. The aligner 230 may also provide decision or determination improvements over the output of the parser 210. The aligner 230 may take into consideration usable alignment aspects that are, for example, any or all of: a) inchoative verbs (sometimes called "inceptive" verbs, and are verbs that show a process of beginning or becoming— e.g., create, show, etc.); b) transparent verbs (e.g., determine, believe, etc.); c) modal verbal constructions (need to be, etc.); d) auxiliary detection (e.g., get, bet [not, no]+ [noun, adj, prep], etc.); e) ambiguity (orders, request, check, update, etc.); f) imperative construction (e.g., have to, need to, etc.); g) coordination (e.g., and, or, and/or, but, otherwise, etc.); h) verbal phrase (e.g., make payment, click on, etc.); i) idiomatic usage (e.g., charge back amount, etc.); and j) POS, PoS constituents, and PoS corrections (verb < > noun, noun < > verb) (e.g., "to make" is clearly a verb-however, "make", by itself is ambiguous, since it could be either a noun or a verb). The output of the aligner 230 (ordered information 240) is provided to an input of the rule executor 250. For clarification, a transparent verb is a verb that has no meaning on its own, and requires additional text for processing. For example, in "I believe", or "I determine", the verbs themselves are not significant, absent what would follow: "I believe X", "I determine Y".

The rule executor 250 may comprise a pre-processor 260, the rules 270 themselves (e.g., a database and/or library comprising information used to execute the rules 270), and a rule applier 280 that applies the rules to the ordered information 240 received by the rule executor 250. The rules 270 may be both syntactic rules and semantic rules. In operation 308, the pre-processor 260 may initially determine a set of triggers in the sentence. A trigger is a word or phrase that operates as a signal that suggests a type of sentence clause. For example, the word "if" is a very strong signal (trigger) suggesting a conditional clause; "should" is a strong signal of an input into a decision clause; and "go" is a strong signal of an imperative clause. Although such words may be strong indicators, they are not, in and of themselves, always right. Thus, the pre-processor 260, the rules 270, and the rule applier 280 may be used to improve the identification of the conditional clause (and other sentence clauses), e.g., the beginning and end of these clauses. The rules 270 thus help to determine when e.g., a false alarm exists in the initial identification of a potential conditional clause. The rule applier 280 may take one or a set of abstract rules from the rules 270 database and apply them to corresponding triggers from the sentence information 240. Each trigger may have one or more rules 270 associated with it. The pre processor 260 may help to determine a match order of a specific subset of the rules to be matched to the respective triggers. The rule can be applied within a trigger sequence.

In operation 310, for all triggers, i.e., for the set of triggers, ("all-trigger activities"), the rule applier 280 may: 1) check to determine if the trigger really starts a conditional rule; 2) check the compatibility of previously extracted triggers; 3) extract the conditional; 4) extract the phrases related to the conditional; 4) choose the action or consequence; and/or 5) choose an unconditional action, if any.

The rules 270 themselves may be built before their use using the lexical, syntactic, and semantic information determined by the parser 210. The rules 270, with one, some, or all being employed (designated "relevant rules", i.e., those relevant as being applicable to the sentence) may be categorized. By way of example, the rules categorization may be as follows: 1) rules for determining a beginning of a conditional clause (e.g., "if", "when", "unless", etc.); 2) rules for determining an end of the conditional clause (e.g., "then"); 3) rules for determining action vs. entailment (e.g., imperatives, modals "should", "can"); 4) rules for determining the continuation of a conditional, such as those determining the presence of multiple conditional sentences; and 5) rules for resolving conflicts associated with the conditional clause, for example, rules for determining which is a condition "context" (e.g., for the phrase, "In the kitchen, if the refrigerator is not running . . . ", "In the kitchen" is a context clause) and which is not, etc.

In operation 315, the sentence clauses, and particularly the conditional clauses, in the sentence may be identified by the rule applier 280 that applies the relevant rules. To do this, the pre-processor 260 may initially look for key words that may be indicative of a conditional clause beginning (e.g., looking for the words "if", "when", "unless", etc. suggesting a start of a conditional clause). The pre processor 260 may also look for key words that may be indicative of a conditional clause ending (e.g., "then").

The pre-processor 260 may also look for imperative constructions and predicative statements. To identify a conditional clause in the sentence, the pre-processor 260 may: 1) determine whether a sequence of lexical items introduces a logical test; 2) determine whether there is a predicate following the beginning of a logical test; 3) determine the scope of the predicate; and 4) determine the end of the conditional clause.

In operation 320, the pre-processor 260 may identify the clauses that are logically connected to the logical test and may determine the applicable rule or subset of rules 270 to be used, which may include both syntactic and semantic rules.

In operation 323, the rule applier 280 may then use the identified rule(s) 270 to determine the roles of the sentence clauses. This may be done by: 1) determining whether an argument from a sentence clause is linked—syntactically or semantically—to the conditional clause; 2) extracting all such clauses (dependent on the logical test-conditional clauses) as candidate clauses; 3) identifying the imperative vs. entailment character of the clause; and 4) determining for each candidate whether it is a context clause or a consequent clause.

In operation 325, the rule applier 280 may then label the sentences accordingly to the above determinations, using, e.g., the above-described JSON labels. Thus, the rule executor 250 produces a tagged/labeled text or sentence output 290 which may then, in operation 330, be used by an additional language processor(ing) and/or an application 295, or sent to a storage device for further use.

Although certain functionality has been described above as being performed by certain of the processing elements or software modules, the various embodiments described herein are not limited thereto and different processing elements and software modules may be utilized to perform the various functionalities described above.

Examples of System Output

As described above, the input text may be in the form of, e.g., text-based sentences. The labeled sentence, or labeled output text, may be in the form of JavaScript Object Notation (JSON) labeled text. The following examples illustrate the input text and output of the system and method disclosed herein, according to various embodiments. In the examples, the labeled output text is broken down into three labeled elements: condition, resultant, and label-resultant. The label-resultant identifies the resultant's relationship with the condition.

Input Text:
    Supplier should transmit one ASN per PO where multiple POs are shipped in single truck container for example; 10 different RDC PO's are ordered for same SKU #123456 and aggregate quantity of 10 orders are sent through single truck (One shipment).

Labeled Output Text:
    {
    "Condition": "where multiple POs are shipped in single truck container for example; 10 different RDC PO\u2019s are ordered for same SKU #123456 and aggregate quantity of 10 orders are sent through single truck (One shipment).",
    "Resultant": "Supplier should transmit one ASN per PO",
    "Label-Resultant": "Action"
    }

Verbal Constructs Examples
Input Text:
    If retail calculator shows any particular store was closed you must follow the below steps:
Labeled Output Text:
    {
    "Condition": "If retail calculator shows any particular store was closed",
    "Resultant": "you must follow the below steps:",
    "Label-Resultant": "Action"
    }

Input Text:
    If PO is not on POD in such case the invoice cannot be concluded for rejection and further verification required to find PO in BOL.
Labeled Output Text:
    {
    "Condition": "If PO is not on POD in such case",
    "Resultant": "the invoice cannot be concluded for rejection and further verification required to find PO in BOL.",
    "Label-Resultant": "Consequence"
    }

Coordination Example
Input Text:
    If valid tracking information is available and there is a POD without any comments make payment by voucher request in Oracle 11G, if valid tracking information is not available need to select the status as P4 in Oracle11 G.
Labeled Output Text:
    {
    "Condition": "If valid tracking information is available and there is a POD without any comments make payment by voucher request in Oracle 11G, if valid tracking information is not available",
    "Resultant": "need to select the status as P4 in Oracle11 G.",
    "Label-Resultant": "Action"
    }

Recategorization of Ambiguous Constructs Examples
Input Text:
    If any keyrecs near to invoice date check for invoice/charge back amount.
Labeled Output Text:
    {
    "Condition": "If any keyrecs near to invoice date",
    "Resultant": "check for invoice/charge back amount.",
    "Label-Resultant": "Action"
    }

Input Text:
    If not received take LTL pro bill number (Second Leg) and check in "Data Base Pro bill NBR Re-search" and look for receiving.

Labeled Output Text:
{
"Condition": "If not received",
"Resultant": "take LTL pro bill number (Second Leg) and check in \u201cData Base Pro bill NBR Re-search\u201d and look for receiving.",
"Label-Resultant": "Action"
}

Complex Constructs Example
Input Text:
If after a review of the transactions, there does not appear to be any third parties identified by the scenario (either through potential data normalization discrepancies or through information identified in the transaction details), the alert can be closed as an Alert Closed-False Positive.

Labeled Output Text:
{
"Condition": "If after a review of the transactions, there does not appear to be any third parties identified by the scenario (either through potential data normalization discrepancies or through information identified in the transaction details),",
"Resultant": "the alert can be closed as an Alert Closed \u2013False Positive.",
"Label-Resultant": "Action"
}

Technical Application

The one or more embodiments disclosed herein accordingly provide an improvement to computer technology. For example, an improvement to natural language processing capabilities, particularly with respect to conditional clauses within a sentence, makes the natural language processing more accurate and thus makes the computer a more accurate interpreter of language.

ADDITIONAL EXAMPLES

The following examples illustrate variations on the embodiments discussed herein.

Example 1 is a computer implemented method, using a natural language processor, comprising:
 receiving an input sentence of natural language from a natural language corpus, the sentence comprising sentence clauses that include a conditional clause;
 performing natural language processing (NLP), using an NLP model, on the input sentence, wherein the processing comprises, using a set of rules:
  determining the sentence clauses and which of the sentence clause is the conditional clause;
  determining one or more logical connections between the sentence clauses; and
  determining a role of the sentence clauses based upon the one or more identified logical connections; and
  tagging the sentence clauses to produce a labeled sentence; and
 outputting the labeled sentence to an entity selected from the group consisting of a storage device, a network interface, a storage device, and an input of a further language processor or application.

Example 2 The method of example 1, wherein the role is selected from the group consisting of: a context, a logical test clause (LTC), a consequent, and an independent.

Example 3 The method of any of examples 1-2, further comprising classifying the consequent as either an action or a consequence.

Example 4 The method of any of examples 1-3, wherein the NLP uses a parser that uses lexical, syntactic, and semantic parsing, and the rules comprise syntactic rules and semantic rules.

Example 5 The method of any of examples 1-4, wherein the parser is used for:
 identifying lemmas, dependencies, constituents, and features; and
 producing sentence metadata.

Example 6 The method of any of examples 1-5, wherein the NLP uses an aligner for:
 receiving the sentence and the sentence metadata comprising syntactic and semantic information; and
 producing sentence information attached to at least one of words or phrases of the sentence by applying usable alignment aspects to the sentence.

Example 7 The method of example 6, wherein the useable alignment aspects are selected from the group consisting of: a) inchoative verbs; b) transparent verbs; c) modal verbal constructions; d) auxiliary detection; e) ambiguity; f) imperative construction; g) coordination; h) verbal phrase; i) idiomatic usage; and j) parts-of-speech (POS), PoS constituents, and PoS corrections.

Example 8 The method of any of examples 6-7, wherein the usable alignment aspects comprise: a) inchoative verbs; b) transparent verbs; c) modal verbal constructions; d) auxiliary detection; e) ambiguity; f) imperative construction; g) coordination; h) verbal phrase; i) idiomatic usage; and j) parts-of-speech (POS), PoS constituents, or PoS corrections.

Example 9 The method of example 8, wherein:
 the inchoative verbs include "create" and "show";
 the transparent verbs include "determine" and "believe";
 the modal verbal construction includes "needs to be";
 the auxiliary detection includes "get" and "be"+ [not, no]+ [noun, adj, prep];
 the ambiguity includes "orders", "request", "check", and "update";
 the imperative construction includes "have to" and "need to"; and
 the coordination includes "and", "or", "and/or", "but", and "otherwise".

Example 10 The method of any of examples 6-9, wherein the NLP uses a rule executor for:
 receiving the ordered information;
 determining a set of triggers within the ordered information; and
 for all triggers, performing all-trigger activities.

Example 11 The method of any of examples 6-10, wherein a rule applier performs the all-trigger activities comprising:
 determining a beginning of a conditional clause;
 determining an end of the conditional clause;
 checking to determine whether the trigger really starts a conditional rule;
 checking a compatibility of previously extracted triggers;
 extracting the conditional clause;
 extracting phrases related to the conditional;
 choosing an action or consequence; and
 choosing an unconditional action when one exists.

Example 12 The method of any of examples 6-11, wherein the rule applier further performs:
 determining an action versus entailment;
 determining a continuation of the conditional clause; and
 resolving a conflict associated with the conditional clause.

Example 13 The method of any of examples 6-12, wherein:
the determining of the beginning of a conditional clause comprises use of the words "if", "when", and "unless";
the determining of the end of the conditional clause comprises use of the word "then";
the determining the action versus entailment comprises using at least one of imperatives and the modals "should" and "can";
the resolving of the conflicts associated with the conditional clause use rules for determining which is context and which is not.

Example 14 The method of any of examples 1-13, further comprising using a pre-processor for:
determining whether a sequence of lexical items introduces a logical test;
determining whether there is a predicate following the beginning of a logical test;
determining a scope of the predicate; and
determining the end of the conditional clause.

Example 15 The method of any of examples 11-14, wherein the rule applier identifies logically linked conditional clauses that are logically linked to a logical test clause (LTC) by:
determining whether an argument from a particular clause is linked syntactically or semantically to the conditional clause;
extracting all such conditional clauses as candidates;
identifying an imperative versus an entailment character of the clause; and
determining for each candidate whether it is a context clause or a consequent clause.

Example 16 A natural language processing apparatus, comprising:
a memory; and
a processor that is configured to:
receive an input sentence of natural language from a natural language corpus, the sentence comprising sentence clauses that include a conditional clause;
perform natural language processing (NLP), using an NLP model, the input sentence, wherein the processing comprises, using a set of rules:
determine the sentence clauses and which of the sentence clause is the conditional clause;
determine one or more logical connections between the sentence clauses; and
determine a role of the sentence clauses based upon the one or more identified logical connections; and
tag the sentence clauses to produce a labeled sentence; and
output the labeled sentence to an entity selected from the group consisting of a storage device, a network interface, a storage device, and an input of a further language processor or application.

Example 17 The apparatus of example 16, wherein the NLP uses a parser that uses lexical, syntactic, and semantic parsing, and the rules comprise syntactic rules and semantic rules.

Example 18 The apparatus of examples 16-17, wherein the NLP uses an aligner for:
receiving the sentence and the sentence metadata; and
producing sentence information attached to at least one of words or phrases of the sentence by applying usable alignment aspects to the sentence.

Example 19 The apparatus of examples 16-18, wherein the NLP uses a rule executor for:
receiving sentence information;
determining a set of triggers within the sentence information; and
for all triggers, performing all-trigger activities, wherein the all-trigger activities cause the processor to:
determine a beginning of a conditional clause;
determine an end of the conditional clause;
check to determine whether the trigger really starts a conditional rule;
check a compatibility of previously extracted triggers;
extract the conditional clause;
extract phrases related to the conditional;
choose an action or consequence; and
choose an unconditional action when one exists.

Example 20 is a computer program product for a natural language processing apparatus, the computer program product comprising:
one or more computer readable storage media, and program instructions collectively stored on the one or more computer readable storage media, the program instructions comprising program instructions to:
receive an input sentence of natural language from a natural language corpus, the sentence comprising sentence clauses that include a conditional clause;
perform natural language processing (NLP), using an NLP model, the input sentence, wherein the processing comprises, using a set of rules:
determine the sentence clauses and which of the sentence clause is the conditional clause;
determine one or more logical connections between the sentence clauses; and
determine a role of the sentence clauses based upon the one or more identified logical connections; and
tag the sentence clauses to produce a labeled sentence; and
output the labeled sentence to an entity selected from the group consisting of a storage device, a network interface, a storage device, and an input of a further language processor or application.

What is claimed is:

1. A computer implemented method, using a natural language processor, comprising:
receiving an input sentence of natural language from a natural language corpus, the sentence comprising sentence clauses that include a conditional clause;
creating tokens from a sequence of input characters of the input sentence using a lexical analyzer, wherein the tokens represent a word or multi-word concept;
building a data structure from the tokens of the input sentence by a syntactic parser thereby providing a structural representation of the input sentence;
converting a natural language utterance in the input sentence to a machine-understandable representation of its meaning by a semantic parser;
aligning outputs of the syntactic parser and the semantic parser into a cohesive sentence information to be used by a rule executor in order to identify a beginning and ending of the sentence clauses, wherein the sentence information is attached to the input sentence;
applying rules to the sentence information received by the rule executor;
applying one or a set of abstract rules from a rules database to corresponding triggers from the sentence information, wherein each of the triggers corresponds to a word or phrase that operates as a signal that suggests a type of sentence clause, wherein each of the triggers is associated with one or more rules;

performing natural language processing (NLP), using an NLP model, on the input sentence with the attached sentence information, wherein the processing comprises, using a set of syntactic and semantic rules received by the rule executor:

determining the sentence clauses and which of the sentence clause is the conditional clause;

determining one or more logical connections between the sentence clauses; and determining a role of the sentence clauses based upon the one or more identified logical connections;

wherein the natural language processing leverages a machine learning technique to perform machine-learning text classification and machine-learning text comparison, wherein the machine-learning text classification comprises machine-learning operations to convert characters, text, words, and phrases to numerical values, wherein the numerical values are inputted into a neural network to determine features and characteristics of words with respect to a document or in relation to other words, wherein the machine-learning text comparison uses the numerical values of the converted characters, text, words, and phrases for performing a comparison, wherein the comparison is a comparison of a numerical value of a first word or other text to a numerical value of a second word or other text, wherein numerical operations of the machine-learning text classification and the machine-learning text comparison are a function of mathematical operations performed through the neural network;

tagging the sentence clauses to produce a labeled sentence; and outputting the labeled sentence to an entity selected from the group consisting of a storage device, a network interface, a storage device, and an input of a further language processor or application, wherein the labeled sentence is in a form of a JavaScript Object Notation labeled text, wherein the labeled sentence is broken down into labeled elements of condition, resultant, and label-resultant.

2. The method of claim 1, wherein the role is selected from the group consisting of: a context, a logical test clause (LTC), a consequent, and an independent.

3. The method of claim 2, further comprising classifying the consequent as either an action or a consequence.

4. The method of claim 1, wherein the NLP further uses a lexical parser, and the rules comprise syntactic rules and semantic rules.

5. The method of claim 4, wherein the syntactic and semantic parsers are used for:

identifying lemmas, dependencies, constituents, and features; and producing sentence metadata.

6. The method of claim 5, wherein the NLP uses an aligner for:

receiving the sentence and the sentence metadata comprising syntactic and semantic information; and producing the sentence information attached to at least one of words or phrases of the sentence by applying usable alignment aspects to the sentence.

7. The method of claim 6, wherein the useable alignment aspects are selected from the group consisting of: a) inchoative verbs; b) transparent verbs; c) modal verbal constructions; d) auxiliary detection; e) ambiguity; f) imperative construction; g) coordination; h) verbal phrase; i) idiomatic usage; and j) parts-of-speech (POS), PoS constituents, and PoS corrections.

8. The method of claim 7, wherein the usable alignment aspects comprise: a) inchoative verbs; b) transparent verbs; c) modal verbal constructions; d) auxiliary detection; e) ambiguity; f) imperative construction; g) coordination; h) verbal phrase; i) idiomatic usage; and j) parts-of-speech (POS), PoS constituents, or PoS corrections.

9. The method of claim 8, wherein:

the inchoative verbs include "create" and "show";

the transparent verbs include "determine" and "believe";

the modal verbal construction includes "needs to be";

the auxiliary detection includes "get" and "be"+ [not, no]+ [noun, adj, prep];

the ambiguity includes "orders", "request", "check", and "update";

the imperative construction includes "have to" and "need to"; and the coordination includes "and", "or", "and/or", "but", and "otherwise".

10. The method of claim 6, wherein the NLP uses the rule executor for:

receiving the sentence information;

determining a set of triggers within the sentence information; and for all triggers, performing all-trigger activities.

11. The method of claim 10, wherein a rule applier performs the all-trigger activities comprising:

determining a beginning of a conditional clause;

determining an end of the conditional clause;

checking to determine whether the trigger really starts a conditional rule;

checking a compatibility of previously extracted triggers;

extracting the conditional clause;

extracting phrases related to the conditional;

choosing an action or consequence; and choosing an unconditional action when one exists.

12. The method of claim 11, wherein the rule applier further performs:

determining an action versus entailment;

determining a continuation of the conditional clause; and resolving a conflict associated with the conditional clause.

13. The method of claim 11, wherein:

the determining of the beginning of a conditional clause comprises use of the words "if", "when", and "unless";

the determining of the end of the conditional clause comprises use of the word "then";

the determining the action versus entailment comprises using at least one of imperatives and the modals "should" and "can";

the resolving of the conflicts associated with the conditional clause use rules for determining which is context and which is not.

14. The method of claim 11, wherein the rule applier identifies logically linked conditional clauses that are logically linked to a logical test clause (LTC) by:

determining whether an argument from a particular clause is linked syntactically or semantically to the conditional clause;

extracting all such conditional clauses as candidates;

identifying an imperative versus an entailment character of the clause; and determining for each candidate whether it is a context clause or a consequent clause.

15. The method of claim 1, further comprising using a pre-processor for:

determining whether a sequence of lexical items introduces a logical test;
determining whether there is a predicate following the beginning of a logical test;
determining a scope of the predicate; and
determining the end of the conditional clause.

16. A natural language processing apparatus, comprising:
a memory; and
a processor that is configured to:
  receive an input sentence of natural language from a natural language corpus, the sentence comprising sentence clauses that include a conditional clause;
  create tokens from a sequence of input characters of the input sentence using a lexical analyzer, wherein the tokens represent a word or multi-word concept;
  build a data structure from the tokens of the input sentence by a syntactic parser thereby providing a structural representation of the input sentence;
  convert a natural language utterance in the input sentence to a machine-understandable representation of its meaning by a semantic parser;
  align outputs of the syntactic parser and the semantic parser into a cohesive sentence information to be used by a rule executor in order to identify a beginning and ending of the sentence clauses, wherein the sentence information is attached to the input sentence;
  apply rules to the sentence information received by the rule executor;
  apply one or a set of abstract rules from a rules database to corresponding triggers from the sentence information, wherein each of the triggers corresponds to a word or phrase that operates as a signal that suggests a type of sentence clause, wherein each of the triggers is associated with one or more rules;
  perform natural language processing (NLP), using an NLP model, on the input sentence with the attached sentence information, wherein the processing comprises, using a set of syntactic and semantic rules received by the rule executor:
    determine the sentence clauses and which of the sentence clause is the conditional clause;
    determine one or more logical connections between the sentence clauses; and
    determine a role of the sentence clauses based upon the one or more identified logical connections;
  wherein the natural language processing leverages a machine learning technique to perform machine-learning text classification and machine-learning text comparison, wherein the machine-learning text classification comprises machine-learning operations to convert characters, text, words, and phrases to numerical values, wherein the numerical values are inputted into a neural network to determine features and characteristics of words with respect to a document or in relation to other words, wherein the machine-learning text comparison uses the numerical values of the converted characters, text, words, and phrases for performing a comparison, wherein the comparison is a comparison of a numerical value of a first word or other text to a numerical value of a second word or other text, wherein numerical operations of the machine-learning text classification and the machine-learning text comparison are a function of mathematical operations performed through the neural network;
  tag the sentence clauses to produce a labeled sentence; and
  output the labeled sentence to an entity selected from the group consisting of a storage device, a network interface, a storage device, and an input of a further language processor or application, wherein the labeled sentence is in a form of a JavaScript Object Notation labeled text, wherein the labeled sentence is broken down into labeled elements of condition, resultant, and label-resultant.

17. The apparatus of claim 16, wherein the NLP further uses a lexical parser, and the rules comprise syntactic rules and semantic rules.

18. The apparatus of claim 16, wherein the NLP uses an aligner for:
  receiving the sentence and the sentence metadata; and
  producing the sentence information attached to at least one of words or phrases of the sentence by applying usable alignment aspects to the sentence.

19. The apparatus of claim 18, wherein the NLP uses the rule executor for:
  receiving the sentence information;
  determining a set of triggers within the sentence information; and
  for all triggers, performing all-trigger activities, wherein the all-trigger activities cause the processor to:
    determine a beginning of a conditional clause;
    determine an end of the conditional clause;
    check to determine whether the trigger really starts a conditional rule;
    check a compatibility of previously extracted triggers;
    extract the conditional clause;
    extract phrases related to the conditional;
    choose an action or consequence; and
    choose an unconditional action when one exists.

20. A computer program product for a natural language processing apparatus, the computer program product comprising:
  one or more computer readable storage media, and program instructions collectively stored on the one or more computer readable storage media, the program instructions comprising program instructions to:
    receive an input sentence of natural language from a natural language corpus, the sentence comprising sentence clauses that include a conditional clause;
    create tokens from a sequence of input characters of the input sentence using a lexical analyzer, wherein the tokens represent a word or multi-word concept;
    build a data structure from the tokens of the input sentence by a syntactic parser thereby providing a structural representation of the input sentence;
    convert a natural language utterance in the input sentence to a machine-understandable representation of its meaning by a semantic parser;
    align outputs of the syntactic parser and the semantic parser into a cohesive sentence information to be used by a rule executor in order to identify a beginning and ending of the sentence clauses, wherein the sentence information is attached to the input sentence;
    apply rules to the sentence information received by the rule executor;
    apply one or a set of abstract rules from a rules database to corresponding triggers from the sentence information, wherein each of the triggers corresponds to a word or phrase that operates as a signal that suggests a type of sentence clause, wherein each of the triggers is associated with one or more rules;

perform natural language processing (NLP), using an NLP model, on the input sentence with the attached sentence information, wherein the processing comprises, using a set of syntactic and semantic rules received by the rule executor:
- determine the sentence clauses and which of the sentence clause is the conditional clause;
- determine one or more logical connections between the sentence clauses; and
- determine a role of the sentence clauses based upon the one or more identified logical connections;

wherein the natural language processing leverages a machine learning technique to perform machine-learning text classification and machine-learning text comparison, wherein the machine-learning text classification comprises machine-learning operations to convert characters, text, words, and phrases to numerical values, wherein the numerical values are inputted into a neural network to determine features and characteristics of words with respect to a document or in relation to other words, wherein the machine-learning text comparison uses the numerical values of the converted characters, text, words, and phrases for performing a comparison, wherein the comparison is a comparison of a numerical value of a first word or other text to a numerical value of a second word or other text, wherein numerical operations of the machine-learning text classification and the machine-learning text comparison are a function of mathematical operations performed through the neural network;

tag the sentence clauses to produce a labeled sentence; and output the labeled sentence to an entity selected from the group consisting of a storage device, a network interface, a storage device, and an input of a further language processor or application, wherein the labeled sentence is in a form of a JavaScript Object Notation labeled text, wherein the labeled sentence is broken down into labeled elements of condition, resultant, and label-resultant.

* * * * *